United States Patent [19]

Kobayashi et al.

[11] Patent Number: 5,012,523
[45] Date of Patent: Apr. 30, 1991

[54] DIMENSION CHECKING METHOD

[75] Inventors: Kenichi Kobayashi, Tokyo; Shougo Matsui, Sagamihara, both of Japan

[73] Assignee: Fujitsu Limited, Kawasaki, Japan

[21] Appl. No.: 291,358

[22] Filed: Dec. 29, 1988

Related U.S. Application Data

[63] Continuation of Ser. No. 023,743, Mar. 9, 1987, abandoned.

[30] Foreign Application Priority Data

Mar. 10, 1986 [JP] Japan .................................. 61-051960

[51] Int. Cl.$^5$ .............................................. G06K 9/00
[52] U.S. Cl. ............................................. 382/8; 382/1; 358/107
[58] Field of Search .................... 382/8, 22, 25, 7, 1; 358/101, 107, 106; 356/376–377, 386–387, 384, 398; 364/560

[56] References Cited

U.S. PATENT DOCUMENTS

| | | | |
|---|---|---|---|
| 3,854,822 | 12/1974 | Altman et al. | 356/156 |
| 4,017,721 | 4/1977 | Michaud | 358/217 |
| 4,163,212 | 7/1979 | Buerger et al. | 382/8 |
| 4,233,625 | 11/1980 | Altman | 382/8 |
| 4,500,202 | 2/1985 | Smyth | 382/8 |
| 4,635,289 | 1/1987 | Doyle et al. | 382/8 |
| 4,644,583 | 2/1987 | Watanabe et al. | 358/107 |
| 4,695,982 | 9/1987 | Preysman | 358/107 |

FOREIGN PATENT DOCUMENTS

| | | |
|---|---|---|
| 0160160 | 4/1987 | European Pat. Off. . |
| 2219398 | 2/1975 | France . |
| 2263492 | 3/1975 | France . |
| 2157825A | 10/1985 | United Kingdom . |

Primary Examiner—Michael Razavi
Attorney, Agent, or Firm—Armstrong, Nikaido, Marmelstein, Kubovcik & Murray

[57] ABSTRACT

A method for checking dimensions of patterns comprising: a first process of selecting patterns of a predetermined kind from a number of patterns including various kinds of patterns; and a second process of judging whether or not each of the selected patterns is formed with a predetermined dimension. The first process comprises the following steps: (i) recognizing the shape of each pattern; and (ii) selecting patterns to be checked by excluding patterns having more than a first degree of difference in shape. The second process comprises the following steps: (iii) calculating the position of the center of gravity of the selected pattern; (iv) representing an upper limit pattern image and a lower limit pattern image and superimposing the images on the image of the selected pattern with the centers of gravity of the upper and lower limit patterns coinciding with that of the selected pattern; and (v) judging an acceptability of the pattern according to whether or not the selected pattern image is represented between the upper limit pattern image and the lower limit pattern image.

6 Claims, 5 Drawing Sheets

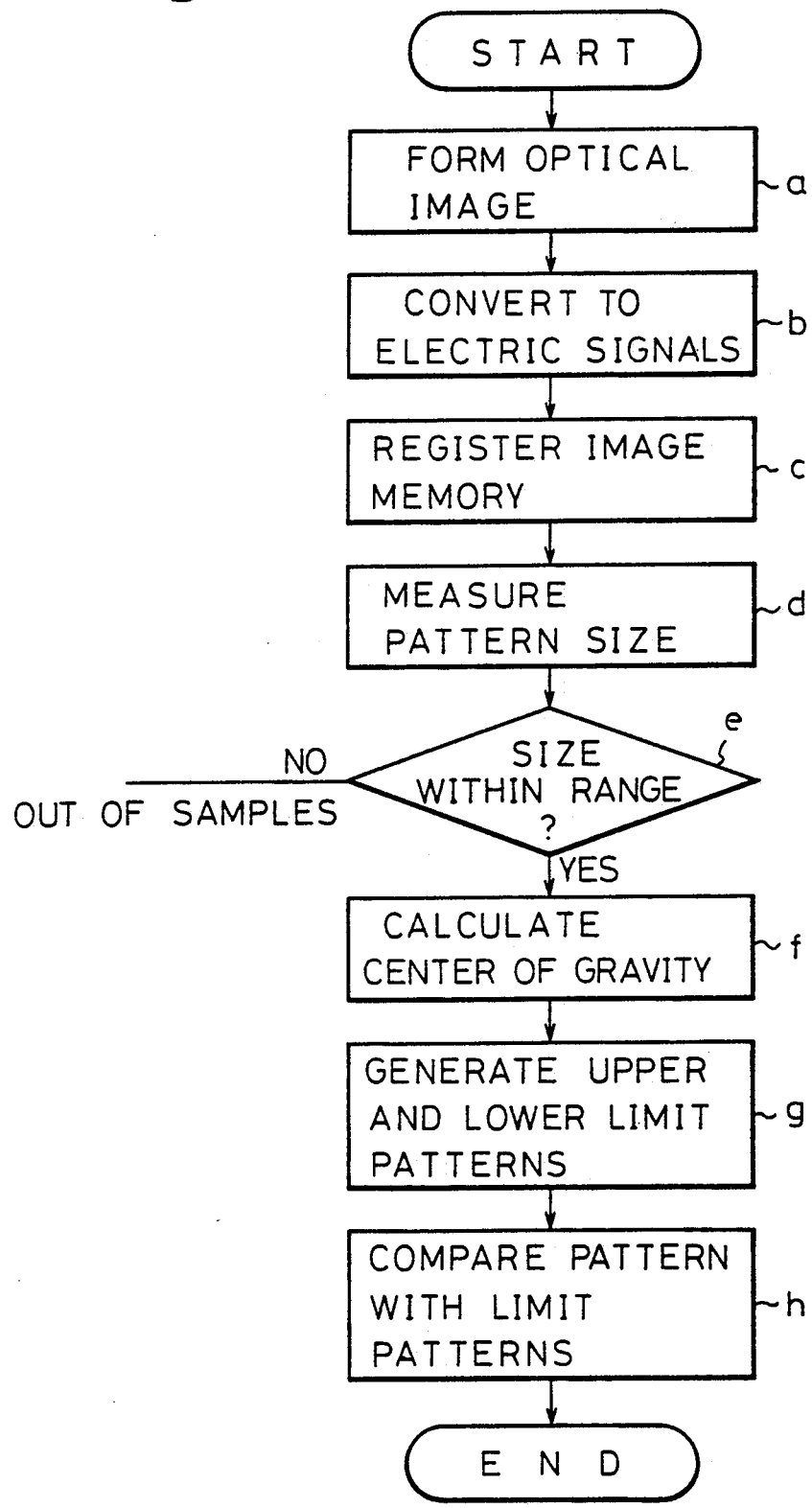

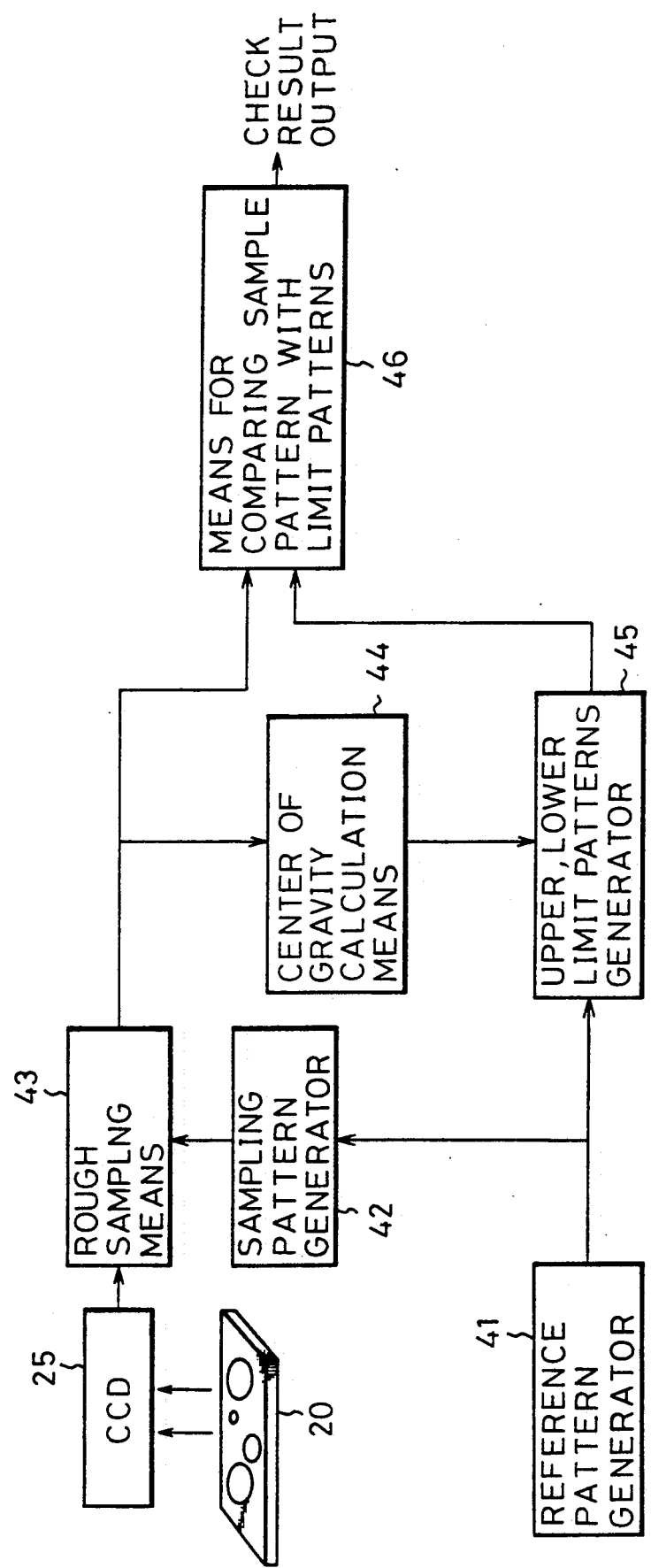

DIMENSION CHECKING METHOD

This application is a continuation of application Ser. No. 023,743 filed Mar. 9, 1987 and now abandoned.

BACKGROUND OF THE INVENTION (1) Technical Field of the Invention

The present invention relates to a method for checking the dimensions of patterns, more particularly to a method by which it can be easily determined whether or not the minute patterns formed on a semiconductor wafer satisfy a predetermined standardized dimensional requirement.

(2) Description of the Related Art

The circuit patterns of a semiconductor integrated circuit must be accurately formed to guarantee the high quality thereof, and therefore, the patterns are checked at each process in the production of the semiconductor products.

In the conventional pattern checking method, first, an operator discriminates patterns having a predetermined shape, and to be checked, from various kinds of patterns formed on a wafer. The sampled patterns are then displayed on a monitoring display wherein the dimensions of the patterns are measured against a scale and judged to be acceptable or unacceptable.

Today, IC's are integrated at a much higher density than before, and thus the circuit patterns are becoming more minute. Therefore, it is not only difficult to measure and check the size of the pattern but also difficult to discriminate and sample the pattern to be checked, having a predetermined shape, from the various and many kinds of patterns formed on the wafer or the mask.

In the conventional checking method, patterns are displayed in a monitor device and an operator first discriminates the pattern to be checked from the displayed patterns and then checks the dimension of the pattern against a scale. Such a checking operation is time-consuming and difficult, and the reliability of checking is not satisfactory.

SUMMARY OF THE INVENTION

The present invention was made in consideration of the above-mentioned problems of the prior art. Accordingly, an object of the present invention is to provide a dimension checking method wherein the pattern to be checked is automatically selected and sampled and the dimensions thereof can be easily checked and determined.

Therefore, in accordance with the present invention, there is provided a dimension checking method comprising: a first process of selecting patterns of a predetermined kind from a number of various kinds of patterns; and a second process of judging whether or not each of the selected patterns is formed with a predetermined dimension, characterized in that said first process comprises the following steps:

(i) recognizing the shape of each pattern; and (ii) selecting patterns to be checked by excluding patterns having more than a first degree of difference in shape, and said second process comprises the following steps:

(iii) calculating the position of the center of gravity of the selected pattern;

(iv) representing an upper limit pattern image and a lower limit pattern image and superimposing said images on the selected pattern image with the centers of gravity of the upper and lower limit pattern images coinciding with the center of gravity of the selected pattern; and (v) judging an acceptability of the pattern according to whether or not the selected pattern image is represented between the upper limit pattern image and the lower limit pattern image.

With the above method, patterns which are obviously different from the predetermined pattern are excluded beforehand from the patterns to be checked by the pattern recognition method, which enhances the pattern sampling efficiency and minimizes the labor required for the sampling.

Also, the upper limit pattern image and the lower limit pattern image are superimposed on the sample pattern with the centers of gravity of these upper and lower limit pattern images coinciding with the center of gravity of the sampled pattern, which makes it very easy to perform the checking operation.

BRIEF DESCRIPTION OF THE DRAWINGS

FIG. 4 is a flow chart of the method of the present invention; and

FIG. 5 is an explanatory view for explaining the construction of the present invention.

DESCRIPTION OF THE PREFERRED EMBODIMENTS

Figure 1:
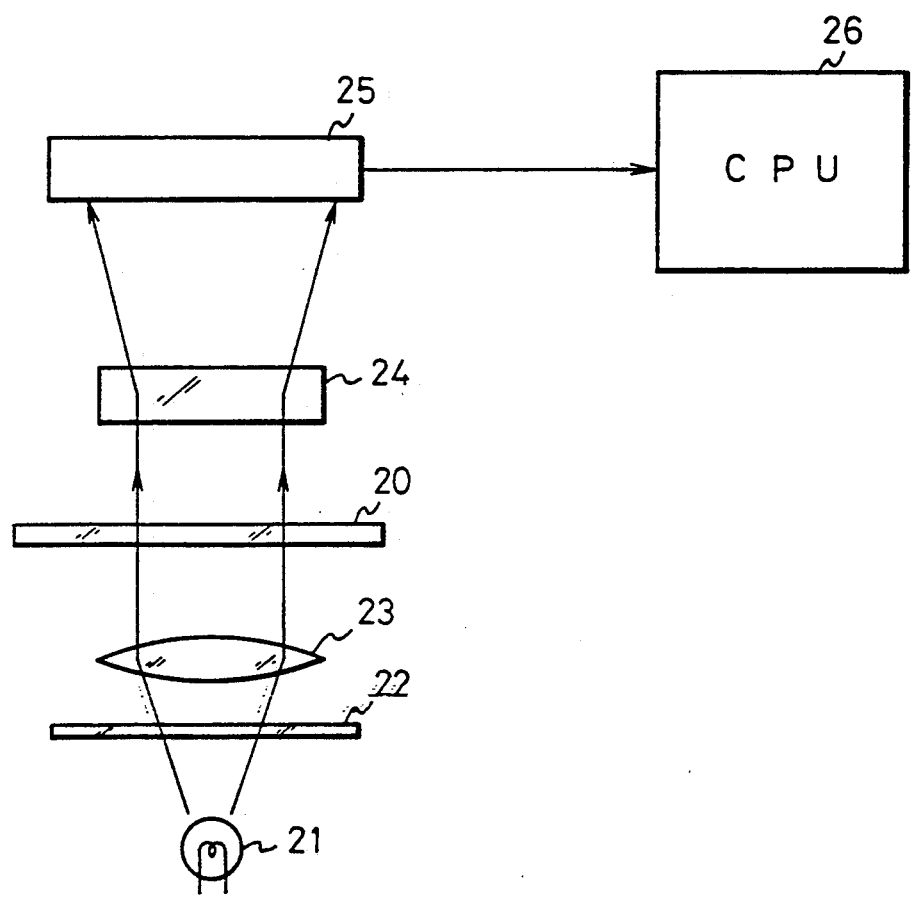
FIG. 1 is a constructional view of a system for achieving the method of the present invention.

The construction of the means for achieving the method of the present invention is illustrated in FIG. 1. As shown in the Figure, a light source 21 is provided to irradiate a photomask 20 having patterns (not shown) to be checked through a filter 22 and a collimating lens 23. The light penetrating through the photomask 20 passes through an optical lens system 24 and the image of the patterns is enlarged and detected by CCD (charge-coupled device) detection means 25. The CCD detection means 25 is interconnected to a CPU (central processing unit) 26 which performs the pattern checking operation described in detail later in accordance with the images of the patterns detected by the CCD detection means 25.

A multi-layer IC device comprises contact holes to connect the circuit pattern of an upper layer and the circuit pattern of a lower layer. Such contact holes are fabricated by using a mask having a pattern for the contact holes. The contact hole pattern is usually very minute (less than two microns in diameter), and therefore, the contact hole pattern inevitably has a circular shape due to the limitations of the resolution ability of the optical system used and the chemical process for developing and etching, although the contact hole pattern is usually designed to have a rectangular shape by using a CAD (computer aided design) system.

These contact holes are usually disposed at grating points at constant intervals, and it is easy to determine whether or not the contact holes are formed at predetermined positions by checking the electrical connection between the upper and lower circuits. However, the size (diameter) of the contact hole can not be easily checked, but since the size of the contact hole is very relevant to the connection resistance between the circuit patterns, it must be accurately measured and checked. In attempts to automatically check the contact hole patterns, methods have been proposed wherein the mask having the contact hole patterns thereon is first positioned in accordance with the given designed data, so that each pattern to be checked is located at a focal point of an optical detection means, and then the size of the pattern is checked. However, such a checking method requires an extremely accurate positioning mechanism and much time is needed to effect a precise alignment of the mask with the optical detection means.

The method of present invention achieves a very efficient pattern checking process by checking only the shape of the pattern, on the assumption that the pattern is correctly positioned.

In the conventional automatic pattern checking process, a check of the pattern position has been thought to be inevitable. However, the present inventors found that it is possible to inspect the pattern by checking only the shape thereof with the use of reference patterns represented on the basis of the position of which the pattern is actually formed, without degrading the practical reliability of the inspection.

Figure 2A:
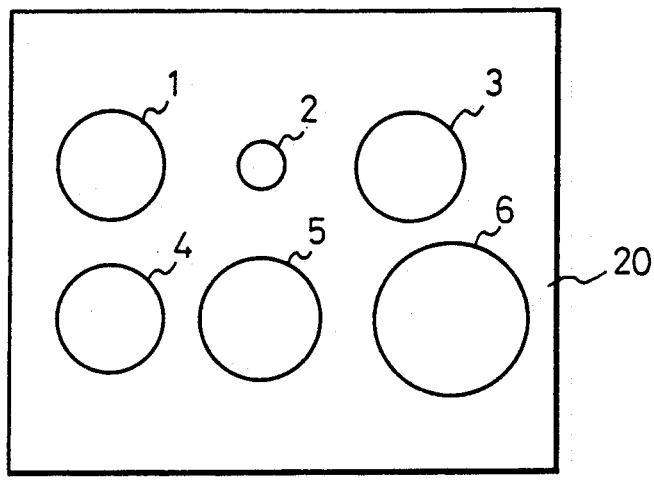
FIGS. 2A to 2C are explanatory views for explaining the sequence of the pattern checking method of the present invention.
Figure 2B:
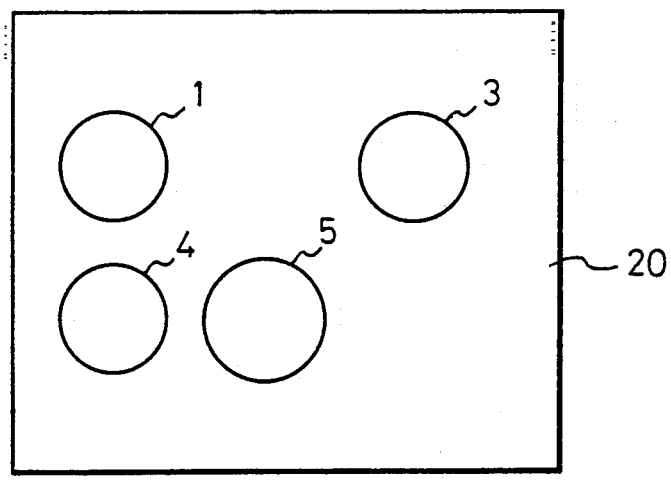
Figure 2C:
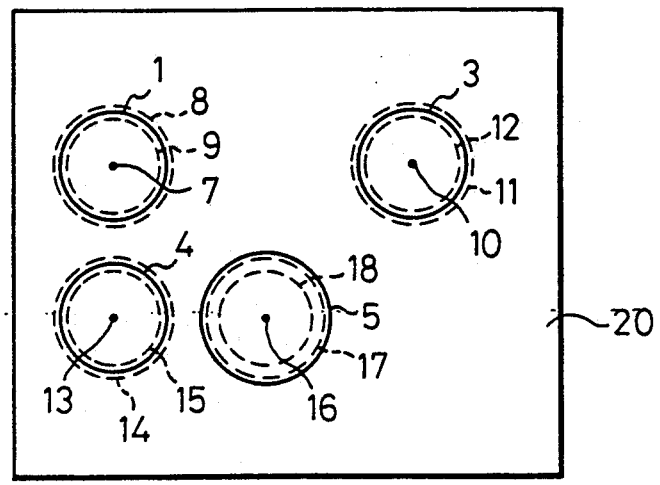

An embodiment of the present invention is described hereinafter with reference to the drawings. FIGS. 2A to 2C are views for explaining the method of checking the dimensions of patterns in accordance with the present invention. FIG. 2A is a plan view of a fragment of a wafer 20 having various kinds of patterns 1–6 formed thereon. Each of the patterns 1–6 is represented as a circle to simplify the explanation. These patterns 1–6 are detected by a CCD detection means through an optical system and form optical images thereof in the CCD (step a in FIG. 4). The optical image of patterns are converted to electric image signals (step b in FIG. 4). The electric image signals are registered in a CPU as an image memory (step c in FIG. 4). Then, the dimensions of each pattern are measured from the width of the image signal thereof, as described later, (step d in FIG. 4). Each measured dimension is compared with a predetermined value (step e in FIG. 4). If the measured dimensions of the pattern are greatly different from the predetermined value, the pattern is excluded from those to be checked. FIG. 2B represents the patterns selected as objects to be checked wherein the small pattern 2 and the large pattern 6 have been excluded from the patterns of FIG. 2A.

Figure 3:
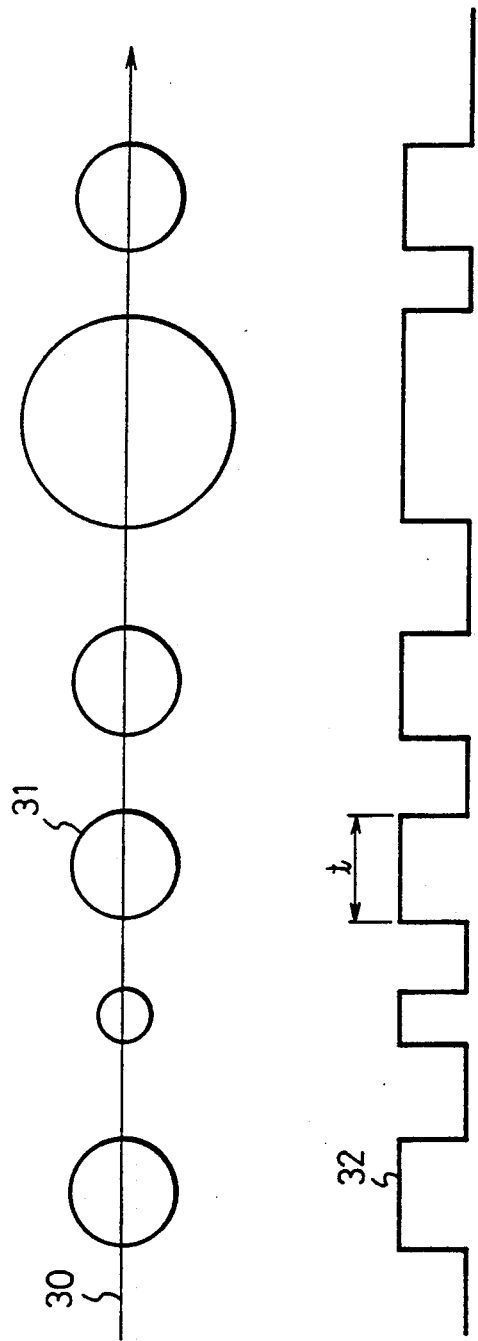
FIG. 3 is an explanatory view for explaining the pattern sampling method of the present invention.

The method of measuring the dimension of the pattern in step d is further described with reference to FIG. 3. A plurality of patterns 31 registered in the image memory are scanned along a line 30 which passes through each center of the patterns so that pulse signals 32 are obtained. The time width (t) of each pulse corresponds to the diameter of each pattern.

The patterns to be excluded are those, having, for example, a size more than 150% larger or less than 50% smaller than a predetermined size. These criteria are changed in accordance with the kind of pattern to be checked and the distribution of the patterns.

In step e, the CPU determines whether or not the pulse time width (t) of each pattern is within a predetermined acceptable range. Patterns having a pulse time width (t) not within the acceptable range are determined to be a different kind of pattern and are excluded from the consideration for checking. Namely, the sampling (selection) of patterns to be checked is conducted in step e.

Subsequently, the center of gravity of each of the remaining selected patterns 1, 3, 4, 5 is calculated (step f in FIG. 4). In FIG. 2C, numerals 7, 10, 13, 16 represent centers of gravity of patterns 1, 3, 4, 5, respectively.

It is easy for the skilled person in this field to calculate the center of gravity of the pattern from the electric image signal thereof, in accordance with the known mathematical formulas.

In accordance with the present invention, the checking process is calculated by determining whether or not the profile of the pattern is within a predetermined range, which is determined on the basis of the center of gravity of the pattern to be checked, thus eliminating the necessity to check the position of the pattern.

Namely, an upper limit pattern profile and a lower limit pattern profile are calculated and represented in the coordinates in common with the patterns to be checked, with the centers of gravity of the upper and lower limit patterns being made to coincide or superimposed with those of the pattern to be checked (step g in FIG. 4). The data of the upper and lower limit patterns is registered in a memory of CPU. For example, as illustrated in FIG. 2C, for the pattern 1, an upper limit pattern 8 and a lower limit pattern 9 are calculated and represented with the center of gravity 7 being common to the three patterns 1, 8, 9. Also, an upper limit pattern and a lower limit pattern are similarly calculated and represented for each of the other patterns 3, 4, 5 to be checked.

Such pattern images may be displayed on a monitor system display or simply stored in a memory.

For standard contact holes, the upper and lower limit patterns are, for example, 0.1 to 0.3μ larger or smaller in size than the predetermined design pattern size.

The CPU reads the data of the actual patterns detected by the CCD and the upper and lower limit patterns from the memory and compares the actual pattern with the upper and lower limit patterns (step h in FIG. 4). The CPU determines that the pattern is acceptable if the pattern is included between the upper and lower limit patterns. In the process of comparing the actual pattern with the upper limit pattern, to satisfy the conditions set for a normal acceptable pattern, all points on the profile and inside the actual pattern image must be inside the upper limit pattern image when represented by the same coordinates. Namely, none of the points constituting the actual pattern image coincides with any of the points on the profile of the upper limit pattern image. On the other hand, in the process of comparing the actual pattern with the lower limit pattern, to satisfy the condition set for a normal acceptable pattern, all the points on the profile of the lower limit pattern image must coincide with the profile or be inside the actual pattern image when represented by the same coordinates. These comparison processes may be displayed on the monitoring means as shown in FIG. 2C, or conducted by a microprocessor disposed in the CPU without displaying the pattern images on the monitor.

As illustrated in FIG. 2C, the represented images of patterns 1, 3, 4 are located between the upper and lower limit pattern images, therefore it is easy to determine that the sizes of the patterns 1, 3, 4 are allowable. On the other hand, the image of pattern 5 is equal to or slightly larger than the image of the upper limit pattern image, therefore it is easy to determine that the pattern 5 is not acceptable.

The means for performing the above mentioned processes of checking minute patterns in a wafer or mask 20 is illustrated in FIG. 5.

FIG. 5 shows a detailed structure of the CPU 26 of FIG. 1. The CPU 26 (FIG. 1) includes: a reference pattern generator 41 for specifying the shape of the pattern to be checked and enabling a display of that shape; a sampling pattern generator 42 for setting a range for selecting patterns as samples to be checked in step e; a rough sampling means 43 for selecting patterns to be checked by excluding patterns having a big difference in size from the reference pattern, in step e; a center of gravity calculation means 44 for calculating centers of gravity of the pattern images in step f; a pattern generator 45 for generating the upper and lower limit patterns in step g; and a comparison means 46 for comparing a selected sample pattern with the limit patterns in step h.

In the above mentioned embodiment of the present invention, one kind of pattern to be checked is automatically sampled from a number of different kinds of patterns formed on the wafer or mask, and the sampled pattern is checked by comparison with an upper limit pattern and a lower limit pattern with the centers of gravity of the limit patterns coinciding with that of the sampled pattern. Therefore, it is easy to determine whether or not the dimension of the pattern is acceptable, thus making it possible to quickly discover problems on the manufacturing process, such as overetching and errors in design, thereby improving the efficiency of the production of IC's, and ensuring a high quality thereof.

The application of the present invention is not limited to checking patterns having a circular shape but can be applied to patterns having a shape other than a circle, such as rectangle.

Also, the application of the present invention is not limited to IC products, but can be generally applied to selecting patterns to be checked from a number of minute patterns, and checking the selected patterns.

As mentioned above, in accordance with the present invention, the dimensions of a pattern can be easily checked, and thus rechecking or the like during the pattern forming process can be quickly conducted, thus enhancing the productivity of IC's having a high quality.

What is claimed is:

1. A method for checking dimensions of patterns comprising the steps of:

a first process for selecting patterns of a predetermined shape from a number of patterns having various kinds of shapes; and a second process for determining whether or not each of the selected patterns is formed with a predetermined dimension, wherein said first process comprises the steps of determining dimensions of each pattern by scanning the pattern along a center of the pattern to obtain pulse signals, a time width of each pulse signal corresponding to dimensions of each pattern, and selecting patterns by excluding patterns having dimensions larger than a predetermined range of dimensions;

wherein the second process comprises the steps of determining a position of a center of gravity of each selected pattern, determining an upper limit pattern image and a lower limit pattern image for each selected pattern, superimposing said upper and lower limit pattern images on a profile of each selected pattern, centers of gravity of each upper and lower limit pattern images being superimposed with the center of gravity of each selected pattern, and determining an acceptability of each selected pattern based upon whether or not each selected pattern is determined to be within a range of the upper limit pattern image and the lower limit pattern image wherein the range of the upper limit pattern image and the lower limit pattern image is smaller than the predetermined range of dimensions of the first process.

2. A method for checking dimensions of patterns having a predetermined shape comprising the steps of:

(a) detecting a plurality of patterns formed on a substrate and forming optical images of said patterns;
   (b) converting said optical image into electric signals;
   (c) storing said electric signals in a memory as data representing a profile of said detected pattern;
   (d) measuring dimensions of each profile of said pattern from said data by scanning the profile of the pattern along a line passing through a center of the pattern so that pulse signals are obtained, a time width of each pulse signal corresponding to a size of each pattern;
   (e) selecting patterns to be checked based upon whether or not the measured dimensions are within a predetermined range of dimensions and excluding patterns having dimensions outside of said predetermined range of dimensions;
   (f) determining a position of a center of gravity of the selected pattern from said data of said profile of said pattern;
   (g) determining an upper limit pattern profile and a lower limit pattern profile with centers of gravity of the upper and lower limit pattern profiles coinciding with the selected pattern center of gravity; and,
   (h) determining the acceptability of the selected pattern based upon whether or not the selected pattern is determined to be within a range of the upper and lower limit pattern profiles wherein said range of the upper and lower limit pattern profiles is smaller than said predetermined range of dimensions.

3. A method according to claim 2, wherein said steps (a) and (b) are conducted by using CCD detection means.

4. A method according to claim 2, wherein said step (h) is conducted by a logic circuit disposed in a CPU.

5. A method according to claim 2, wherein said step (h) is conducted by displaying the sampled pattern image and the upper and lower limit pattern profiles in a monitoring system with the centers of gravity of the limit pattern profiles coinciding with that of the selected limit pattern profiles coinciding with that of the selected pattern.

6. A method according to claim 2, wherein said patterns are for contact holes for an IC and have a circular shape.

* * * * *